United States Patent [19]
Yoshida

[11] Patent Number: 5,401,950
[45] Date of Patent: Mar. 28, 1995

[54] IC CARD HAVING IMPROVED SECURITY CHECKING FUNCTION

[75] Inventor: Hiroya Yoshida, Uji, Japan

[73] Assignee: Omron Tateisi Electronics Co., Kyoto, Japan

[21] Appl. No.: 835,086

[22] Filed: Feb. 18, 1992

Related U.S. Application Data

[63] Continuation of Ser. No. 363,996, Jun. 9, 1989, abandoned.

[30] Foreign Application Priority Data

Jun. 15, 1988 [JP] Japan .................. 63-147785

[51] Int. Cl.6 ..................... G06K 19/00
[52] U.S. Cl. ..................... 235/487
[58] Field of Search ........... 235/379, 380, 492, 487; 380/23, 24, 25; 340/825.34

[56] References Cited

U.S. PATENT DOCUMENTS

| | | | |
|---|---|---|---|
| 4,304,990 | 12/1981 | Atalla | 235/379 |
| 4,443,027 | 4/1984 | McNeely et al. | 235/487 |
| 4,544,833 | 10/1985 | Ugon | 235/379 |
| 4,656,342 | 4/1987 | Ugon | 235/379 |
| 4,684,791 | 8/1987 | Bito | 235/492 |
| 4,697,072 | 9/1987 | Kawana | 235/379 |
| 4,734,568 | 3/1988 | Watanabe | 235/380 |
| 4,746,788 | 5/1988 | Kawana | 340/825.34 |
| 4,810,862 | 3/1989 | Nakano et al. | 235/492 |
| 4,831,245 | 5/1989 | Ogasawara | 235/492 |
| 4,837,422 | 6/1989 | Dethloff et al. | 235/380 |
| 4,853,522 | 8/1989 | Ogasawara | 235/492 |
| 4,879,455 | 11/1989 | Butterworth et al. | 235/492 |
| 4,961,142 | 10/1990 | Elliott | 235/380 |

Primary Examiner—Donald Hajec
Assistant Examiner—Jeffrey R. Filipek
Attorney, Agent, or Firm—Dickstein, Shapiro & Morin

[57] ABSTRACT

An IC card is provided with a data storage area for storing data, an identification code area for storing a plurality of identification codes and directories for storing information indicating which of the identification codes is an identification code authorized to access the data.

When an identification code and information for identifying data are applied so as to make access to a data area in the IC card from the outside of the IC card, the IC card references the directories, recognizes which of the identification codes is an identification code authorized to access data, corresponding to the externally applied information for identifying data, and determines whether or not the identification code corresponds to the externally applied identification code. If there are a plurality of identification codes authorized to access the data, corresponding to the information for identifying data in the directories and a plurality of identification codes are externally applied, checking between the identification codes is performed. Only when all the identification codes correspond to the externally applied identification codes, access of the corresponding data is allowed.

16 Claims, 9 Drawing Sheets

IC CARD HAVING IMPROVED SECURITY CHECKING FUNCTION

This application is a continuation of application Ser. No. 07/363,996, filed Jun. 9, 1989, now abandoned.

BACKGROUND OF THE INVENTION

1. Field of the Invention

The present invention relates generally to IC cards, and more particularly, to an IC card having an improved security checking function.

2. Description of the Background Art

As is well known, an IC card is a card of almost the same size in appearance as those of a cash card and a credit card, which has an IC (integrated circuit) incorporated therein. The IC card is characterized of having significantly larger storage capacity of information, as compared with that of the present card comprising a magnetic stripe. Since various important data are stored in the IC card, it is necessary to care about data security. In the conventional IC card, a security check is performed by the following method. More specifically, when data stored in a storage is accessed, it is determined whether or not a given identification code coincides with an externally applied identification code. If they coincide with each other, reading or writing of data in the corresponding storage area is allowed.

Furthermore, in an IC card which is disclosed in, for example, Japanese Patent Laying-Open Gazette No. 176186/1985, a data storage area in the IC card is divided corresponding to a terminal identification code for identifying the terminal in which the IC card can be used, the IC card itself receives a terminal identification code from the terminal when the IC card is entered in the terminal, and access to only a division area in the data storage area corresponding to the received terminal identification code is allowed.

Out of the above described IC cards, the former has a single identification code. Therefore, if there are a plurality of persons handling a card such as a person issuing a card, a person providing service, and a person having a card, an identification code can not be applied by the persons. Thus, it is difficult to divide an area to be accessed corresponding to the person handling a card. On the other hand, in the latter, an accessible storage area in the IC card is only divided for each terminal. Thus, it is impossible to perform a more detailed check, that is, perform a check of coincidence between an identification code of a person himself or herself using a card and an identification code of the IC card in addition to determination of coincidence between a terminal identification code predetermined for each terminal and a terminal identification code from a terminal, and to allow access if both coincidences are achieved.

Furthermore, in the above described IC cards, when access is allowed by identification of an identification code, all data stored in a storage area where access is allowed can be written and or read, resulting in the problem of lack of data security.

SUMMARY OF THE INVENTION

An object of the present invention is to provide an IC card on which a careful security check can be performed.

Another object of the present invention is to provide an IC card capable of determining whether or not an externally applied identification code corresponds to a predetermined identification code for each data.

According to the present invention, the above described objects are achieved by providing data storage means for storing data, identification code storage means for storing a plurality of identification codes, reference information storage means having a plurality of data identification codes for identifying data and information, corresponding to data identification code, indicating which of the identification codes stored in the identification code storage means is an identification code authorized to use the data, and control means for referencing the reference information storage means when a data identification code and at least one identification code are externally applied to the IC card, selecting one or more identification codes authorized to use the data from the identification code storage means based on the applied data identification code and determining whether or not the selected identification code corresponds to the externally applied identification code, to allow the use of the data.

In accordance with another aspect of the present invention, the IC card comprises, in place of the above described control means, selecting means for selecting, when at least one identification code is externally applied to the IC card, the identification code corresponding to the applied identification code from the identification code storage means, referencing means for referencing, when a data identification code is externally applied to the IC card, the reference information storage means based on the applied data identification code, and determining means for determining whether or not the identification code indicated by reference information stored in the reference information storage means is selected by the selecting means to allow the use of the data.

According to the present invention, a plurality of identification codes and reference information indicating which of the identification codes is the identification code authorized to use for each data are previously stored. When an identification code and information for identifying data intended to use are externally applied, it is determined whether or not the identification code predetermined for each data corresponds to the externally applied identification code, and it is determined whether or not the data can be used based on the result of the determination. Thus, a careful security check can be performed for each data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
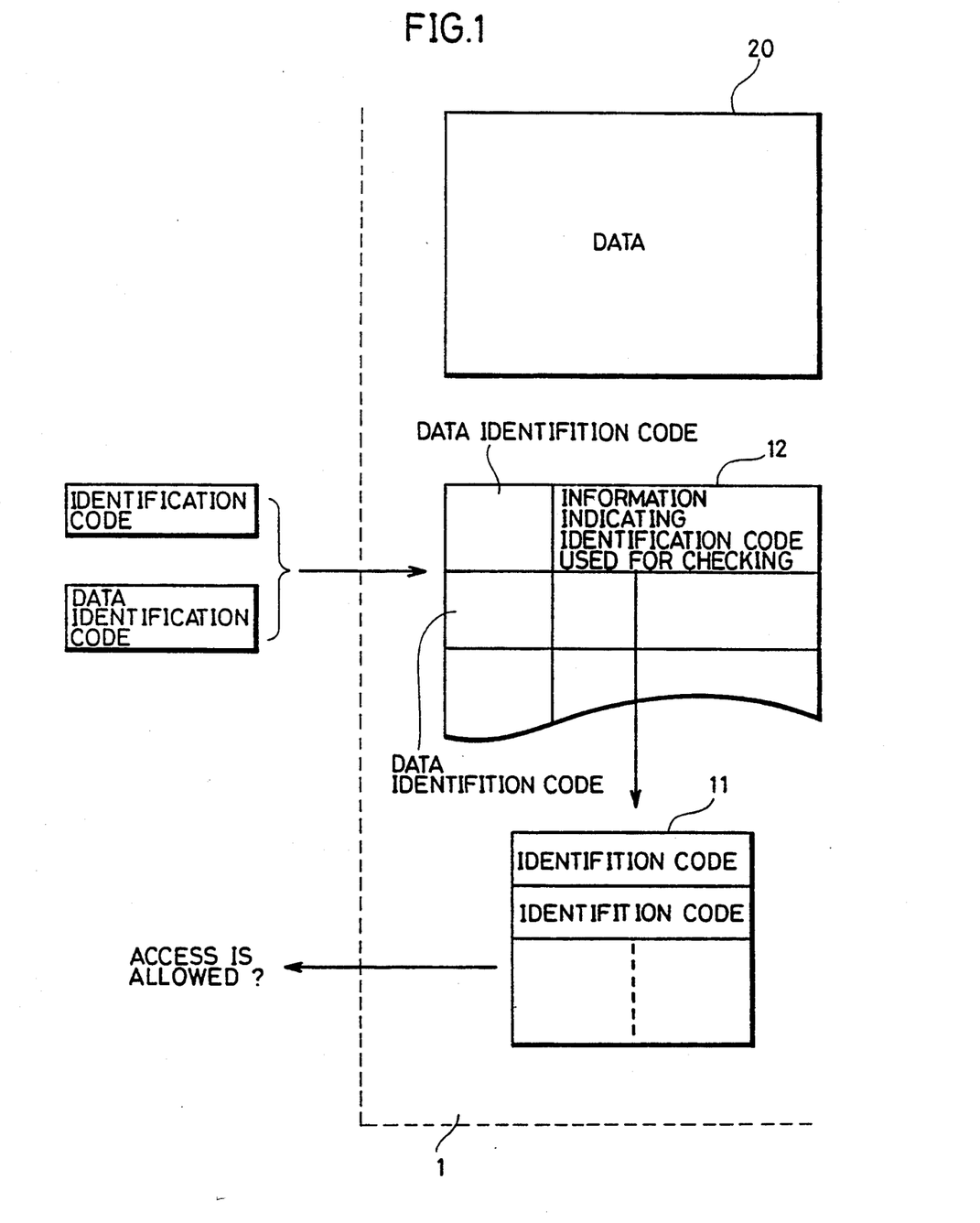
FIG. 1 is a diagram for explaining the outline of an embodiment of the present invention.

FIG. 1 is a diagram for explaining the outline of an embodiment of the present invention. In FIG. 1, a memory in the IC card 1 is provided with a data storage area 20. The data storage area 20 stores various data such as data for depositing/drawing money in/from the bank, data for credit transaction, and data concerning purchase in a supermarket or the like. The data for depositing/drawing money in/from the bank includes data for identifying the bank, data indicating the number of an account with the bank, data indicating the balance at the bank, and the like. The data for credit transaction includes data for identifying a credit company, data indicating a credit card number, and the like. The data concerning purchase includes data indicating a commodity number, data indicating the amount paid, data indicating purchased commodities, and the like. This IC card 1 can be used by, for example, all members of a family. However, it is desired that the data for drawing money from the bank and the data for credit transaction can not be accessed by children. In the present embodiment, an identification code storage area 11 and a directory area 12 are provided with the above described memory so as to determine for each data stored in the data storage area 20 whether or not access is allowed. The identification code storage area 11 stores a plurality of identification codes. The directory area 12 stores, for each data identification code for identifying data, information indicating which of the identification codes stored in the identification code storage area 11 is an identification code authorized to access data corresponding to the data identification code.

When an identification code and a data identification code are applied so as to make access to the data storage area 20 in the IC card 1 from the outside of the IC card, the IC card references the directory area 12, and recognizes which of the identification codes stored in the identification code storage area 11 is an identification code authorized to access data corresponding to an externally applied data identification code and determines whether or not the identification code corresponds to an externally applied identification code. If there are a plurality of identification codes authorized to access the data corresponding to the data identification code in the directory area 12 and a plurality of identification codes are externally applied, it is determined whether or not each of the plurality of identification codes authorized to access the data corresponding to the data identification code corresponds to each of the plurality of identification codes externally applied. Only when all the applied identification codes correspond to the externally applied identification codes, access of the corresponding data is allowed.

A specific structure and an operation of the IC card will be described.

Figure 2:
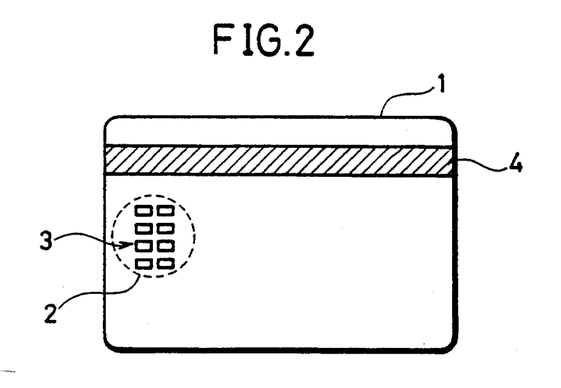
FIG. 2 is a diagram showing the appearance of an IC card according to an embodiment of the present invention.

FIG. 2 is a diagram showing the appearance of the IC card according to an embodiment of the present invention. In FIG. 2, an IC 2 is embedded in the IC card 1. On the surface of the IC card 1, eight connectors 3 for connecting the IC card to an external equipment are formed in an exposed manner. In addition, a magnetic stripe 4 preliminary used is formed.

Figure 3:
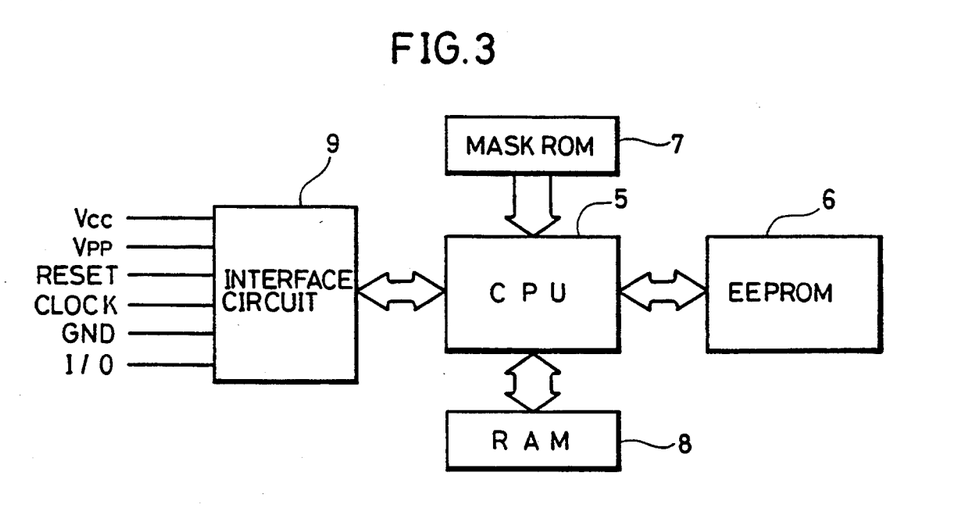
FIG. 3 is a diagram showing a hardware structure of the above described IC card.

FIG. 3 is a diagram showing a hardware structure of the above described IC card. The above described IC 2 comprises a CPU (central processing unit) 5, an EEPROM (electrically erasable programmable read-only memory) 6 which is electrically erasable and programmable and used for storing data, a mask ROM 7 used for storing a program, a working RAM (random access memory) 8, and an interface circuit 9 connected to the connectors 3.

When the IC card 1 is inserted into the external equipment, the power as well as a reset signal and a clock signal are supplied to the IC card 1 from the external equipment. In addition, data is received or sent between the CPU 5 and the external equipment.

Figure 4:
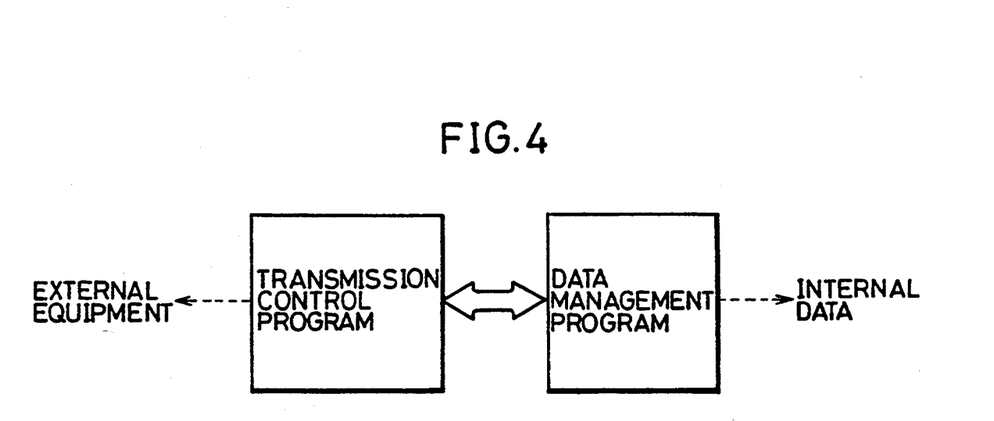
FIG. 4 is a diagram showing a software structure of the above described IC card.

FIG. 4 is a diagram showing a software structure of the above described IC card. A transmission control program for controlling transmission between the external equipment and the CPU 5 and a data management program for managing internal data stored in the EEPROM 6 are stored in the above described mask ROM 7.

Figure 5:
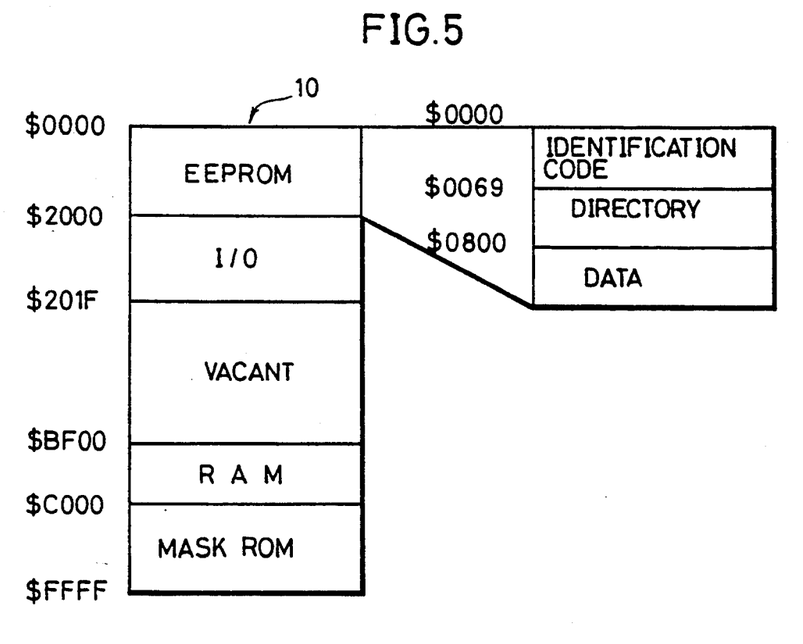
FIG. 5 is a diagram showing a memory map of the above described IC card.

FIG. 5 is a diagram showing a memory map of the above described IC card. In FIG. 5, an area of $0000 to $2000 in a memory space 10 is assigned to the EEPROM 6, an area of $2000 to $201F is assigned to a buffer or the like storing input/output data, an area of $BF00 to $C000 is assigned to the RAM 8, and an area of $C000 to $FFFF is assigned to the mask ROM 7. In the area assigned to the EEPROM 6, an area of $0000 to $0069 is used as an identification code area for storing an identification code, an area of $0069 to $0800 is used as a directory for storing a position where data exists and information concerning an access control method, and an area of $0800 to $2000 is used for storing data.

Figure 6:
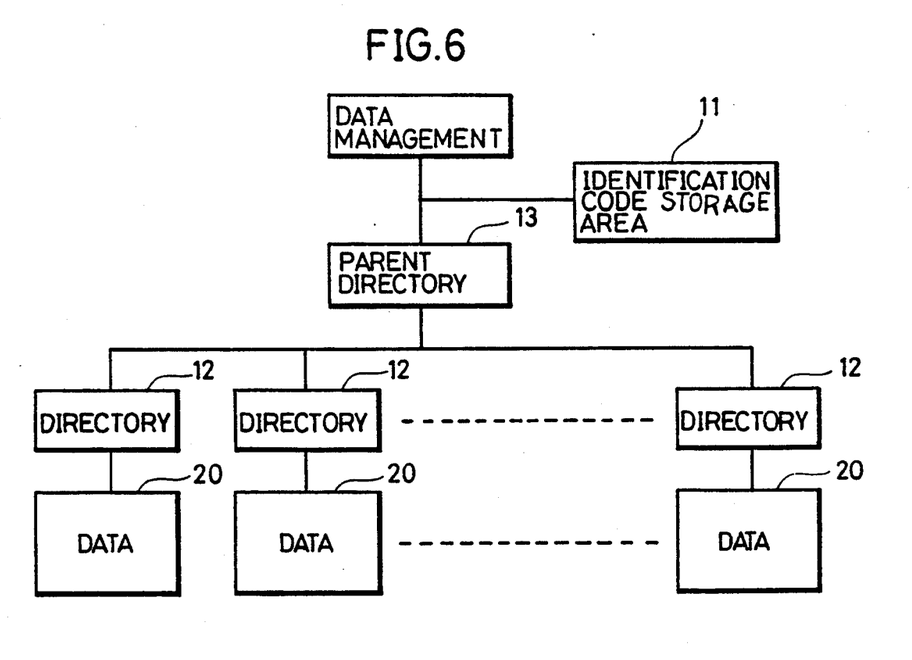
FIG. 6 is a diagram for explaining a data management system in the above described IC card.
Figure 7:
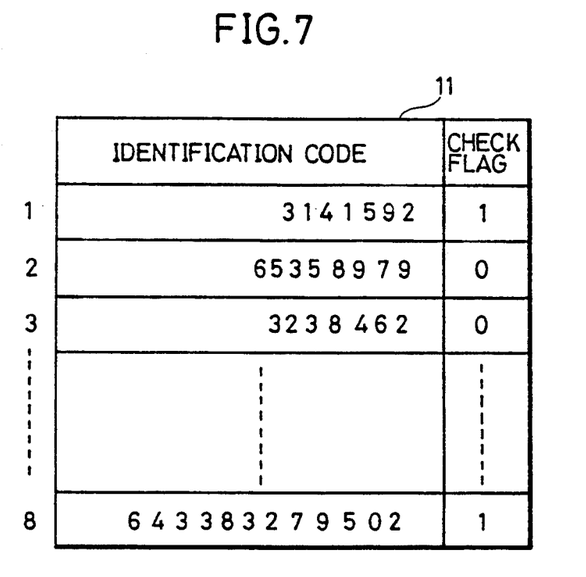
FIG. 7 is a diagram for explaining an identification code storage area shown in FIGS. 5 and 6.
Figure 8:
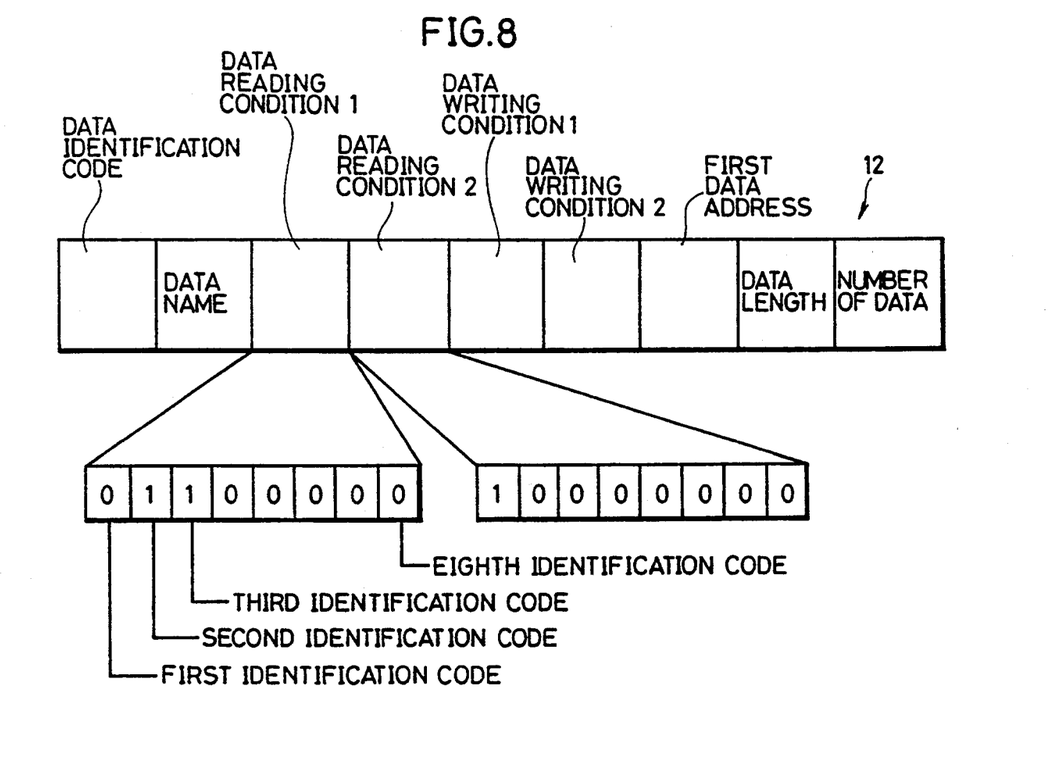
FIG. 8 is a diagram for explaining a directory shown in FIGS. 5 and 6.

FIG. 6 is a diagram for explaining a data management system in the above described IC card, FIG. 7 is a diagram for explaining the above described identification code storage area, and FIG. 8 is a diagram for explaining the above described directory. Referring now to FIGS. 6 to 8, description is made of the data management system according to an embodiment of the present invention.

In FIG. 6, respective data in data storage areas 20 are under management of directories 12, and the directories 12 are under management of a parent directory 13. Access of the respective data in the data storage areas depends on whether or not the condition for coincidence of a predetermined identification code in an identification code storage area 11 is met. The identification code storage area 11 stores, for example, eight identification codes, as shown in FIG. 7. Referring now to FIG. 7, the first identification code is for confirming a parson himself or herself, the second identification code is for a person issuing a card, the third identification code is for utilizing an automatic teller machine of an A bank, and the eighth identification code is for making a purchase in a B supermarket. A check flag is stored, corresponding to each of the identification codes, in the identification code storage area 11. The check flag indicates the result of determination of coincidence between the identification code stored in the identification code storage area 11 and an identification code applied from the external equipment. The check flag "1" indicates that the identification codes coincide with each other, while the check flag "0" indicates that they do not coincide with each other.

As shown in FIG. 8, each of the directories 12 comprises a data identification code, a data name, a data reading conditions 1 and 2, data writing conditions 1 and 2, first data address, a data length, and the number of data. The data reading conditions 1 and 2 respectively comprise 8-bit information, each bit indicating whether or not each of the first to eighth identification codes in the identification code storage area 11 must coincide with the identification code applied from the external equipment. Bit "1" indicates that the identification codes must coincide with each other, while bit "0" indicates that they need not coincide with each other. For example, the data reading condition 1 indicates that data can not be read out unless the second and third identification codes respectively coincide with the identification codes applied from the external equipment, and the data reading condition 2 indicates that data can not be read out unless the first identification code coincides with the identification code applied from the external equipment. The data writing conditions 1 and 2 respectively comprise the same bit information as those of the data reading conditions 1 and 2.

Since the identification codes in the identification code storage area 11 shown in FIG. 7 and the data reading conditions and the data writing conditions in the directory 12 shown in FIG. 8 can be set again from the external equipment in consideration of data security, the condition required to make access for each data can be arbitrarily set. In addition, this setting can be achieved without changes of the programs in the IC card 1. For example, when the importance or secrecy of data changes due to some circumstances, identification codes requiring determination of coincidence and the number of identification codes to be determined can be accordingly changed so that data can be more carefully managed.

FIGS. 9A to 9D are flowcharts for explaining an operation for data management. Referring now to FIGS. 1 to 9D, description is made of a data managing operation.

Figure 9A:
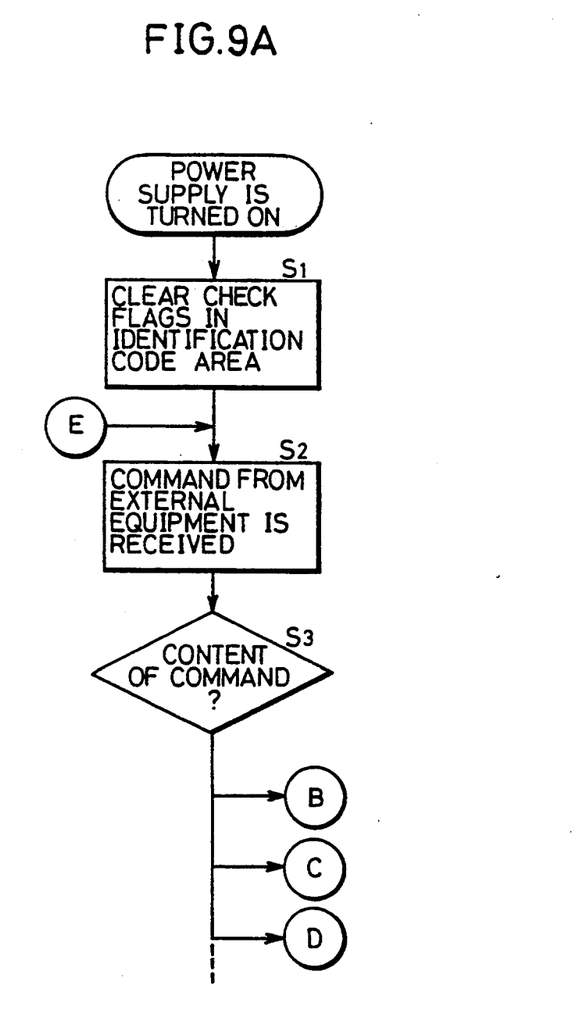
FIGS. 9A and 9D are flowcharts for explaining an operation for data management.

When the IC card 1 is inserted into the external equipment so that the power supply is turned On, the check flags in the identification code storage area 11 are all cleared for initialization in the step S1 (referred to as S1 in the drawing). When a command from the external equipment is received in the step S2, the content of the command is recognized in the step S3. Thereafter, the program is branched according to the content. Various commands are applied from the external equipment. Description is now made of an identification code check command, a data read command, and a data write command.

The identification Code check command is used for checking coincide between the identification code applied from the external equipment and the identification codes stored in the identification code storage area 11. The data read command is used for reading data from a data storage area. The data write command is used for writing data in a data storage area.

Figure 9B:
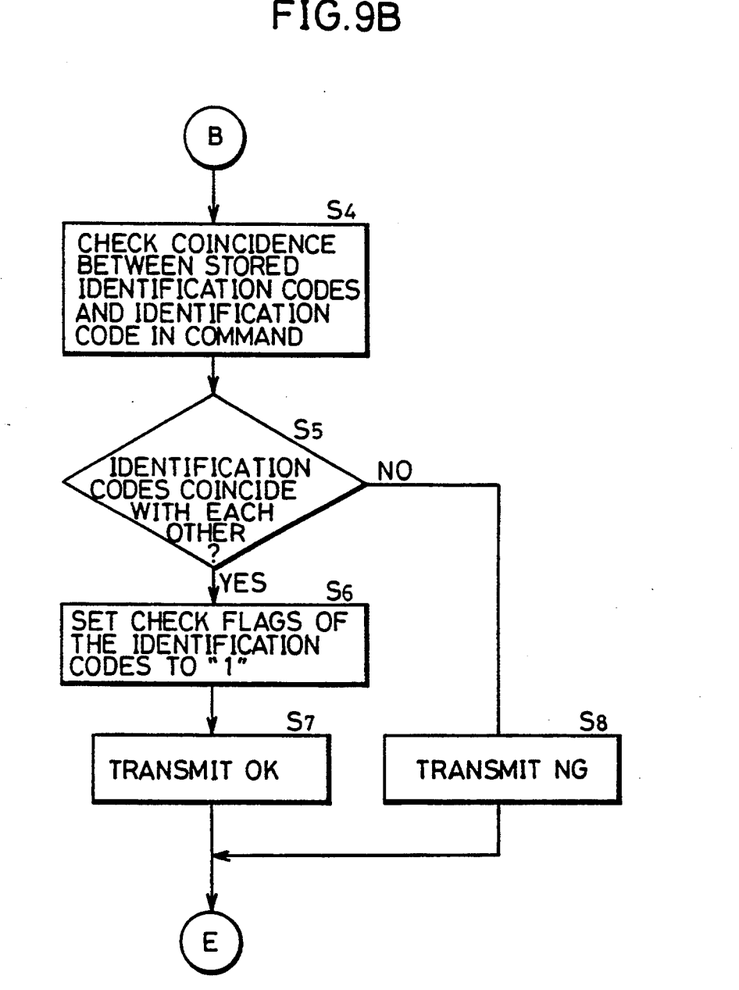

If the command from the external equipment is the identification code check command, the program proceeds to the step S4 (FIG. 9B). In the step S4, whether or not the identification codes stored in the identification code storage area 11 coincide with any of the codes in the command is checked. Subsequently, if there are identification codes which coincide with each other in the step S5, check flags corresponding to the identification codes are set to "1" in the step S6 and then, O.K. signal is transmitted to the external equipment in the step S7. On the other hand, if there are no identification codes which coincide with each other, N.G. signal is transmitted in the step S8. Information indicating that checking of identification code is performed is stored in the RAM 8.

Figure 9C:
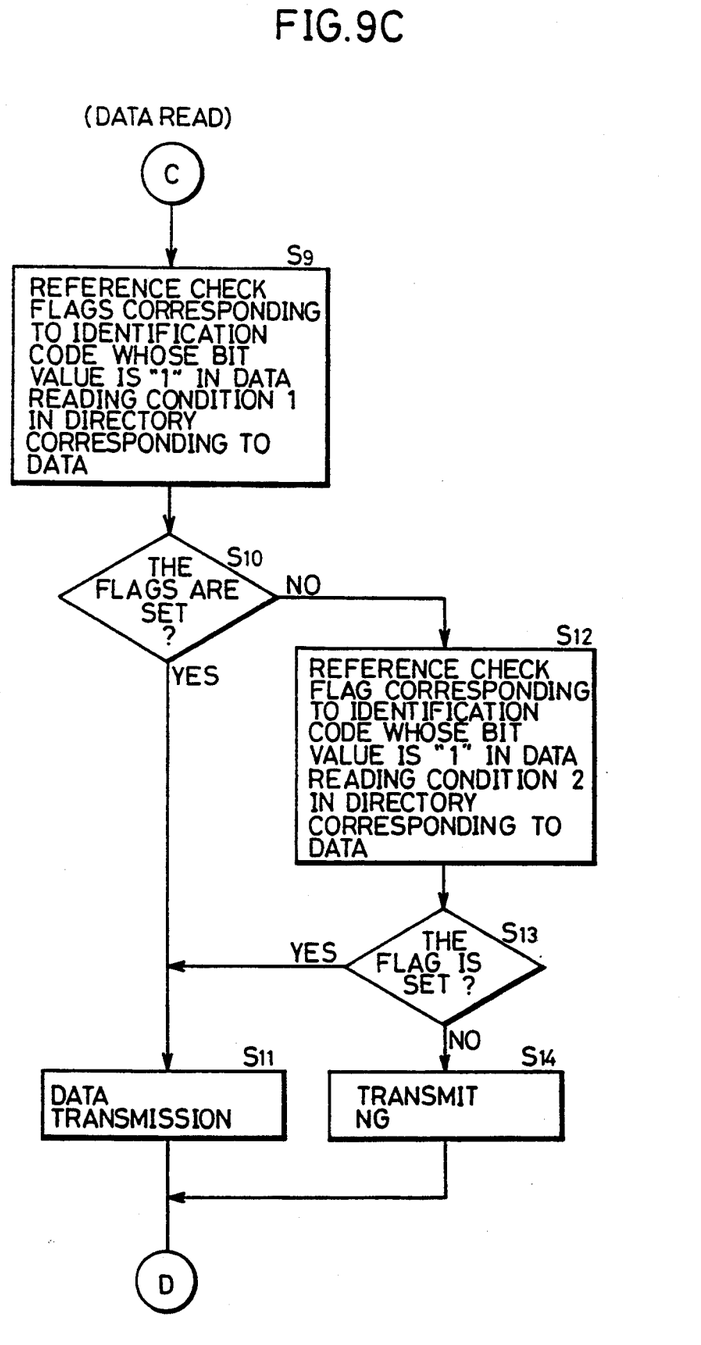

On the other hand, if the command from the external equipment is the data read command or the data write command, the reading conditions and the writing conditions in the directory 12 are referenced, and whether or not checking of identification code is performed before the reception of this command is examined. When the data read command is applied, and as shown in FIG. 9C, reference is made to check flags corresponding to identification codes, whose bit value is "1" in the data reading condition 1 (the second and third identification codes in this example) in the directory corresponding to data to be accessed, in the step S9. Subsequently, it is determined in the step S10 whether or not the check flags are set. If the check flags are set to "1", data can be read out, so that the data is read out from a data area. In the step S11, data is transmitted to the external equipment. On the other hand, if it is determined in the step S10 that the flags are not set to "1", the program proceeds to the step S12. In the step S12, reference is made to a check flag corresponding to an identification code, whose bit value is "1" in the data reading condition 2 (the first identification code in this example) in the directory 12 corresponding to data to be accessed. Subsequently, it is determined in the step S13 whether or not the check flag is set. If the check flag is set to "1", data can be read out, so that the program proceeds to the step S11. In the step S11, data transmission is made. If the check flag is not set to "1", the program proceeds to the step S14. In the step S14, N.G. signal is transmitted to the external equipment.

As described in the foregoing, since a combination of a plurality of kinds of identification codes is set in consideration of data security, a careful security check can be performed. When the data write command is applied, a security check can be performed, similarly to the above described case in which the data read command is applied. An operation to occur when the data write command is applied from the external equipment is shown in the steps S15 to S21 of FIG. 9D. When the data write command is applied, reference is made to check flags corresponding to the identification codes, whose bit value is "1", in the data writing condition 1 in the directory 12 corresponding to data to be accessed. Subsequently, it is determined in the step S16 whether or not the check flags are set. If the check flags are set to "1", data can be written, so that data is written or updated in the corresponding data area in the step S17 and O.K. signal is transmitted to the external equipment in the step S18. On the other hand, if it is determined in the step S16 that the flags are not, set, the program proceeds to the step S19. In the step S19, reference is made to a check flag corresponding to an identification code, whose bit value is "1", in the data writing condition 2 in the directory corresponding to data to be accessed. Subsequently, it is determined in the step S20 whether or not the check flag is set. If the check flag is set to "1", data can be written, so that the program proceeds to the step S17. In the step S17, data is written. If the check flag is not set to "1", the program proceeds to the step S21. In the step S21, N.G. signal is transmitted to the external equipment.

Figure 10:
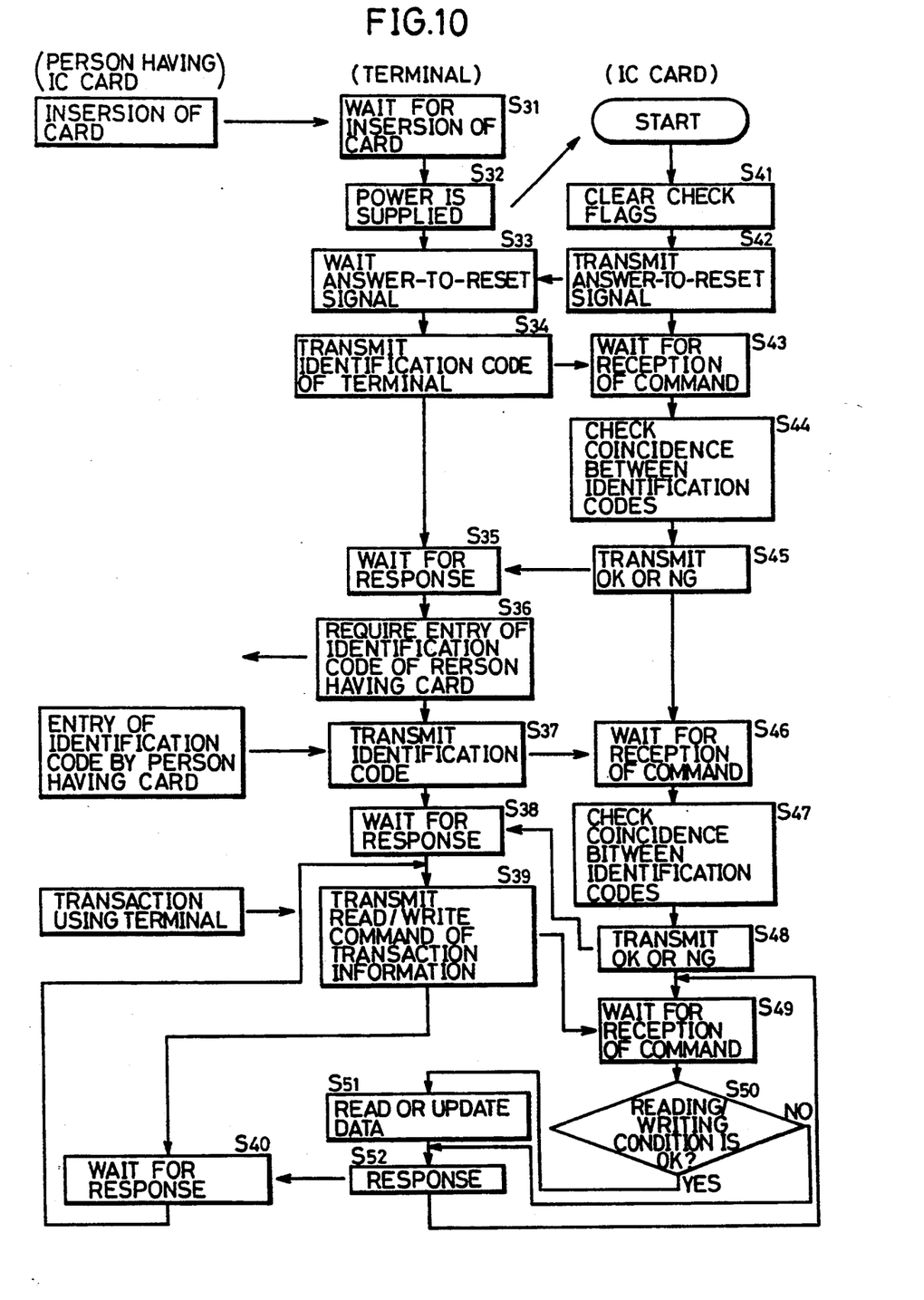
FIG. 10 is a flowchart for explaining an entire operation of the IC card and a terminal which is an example of an external equipment according to the embodiment of the present invention.

FIG. 10 is a diagram for explaining an entire operation of an IC card and a transaction processing terminal which is an example of an external equipment according to an embodiment of the present invention. Referring now to FIGS. 1 to 10, description is made of the entire operation of the terminal and the IC card.

The terminal waits for the insertion of the IC card in the step S31. When a person having an IC card inserts his or her IC card 1 into the terminal, the power is supplied to the IC card 1 in the step S32. Consequently, the CPU 5 in the IC card 1 initiates its operation, to clear all check flags in the identification code storage area 11 in the step S41. Subsequently, an answer-to-reset signal is transmitted to the terminal in the step S42. The terminal waits for the reception of the signal in the step S33. In the step S34, an identification code of the terminal itself is transmitted to the IC card 1 in response to the reception of the answer-to-reset signal.

Figure 9D:
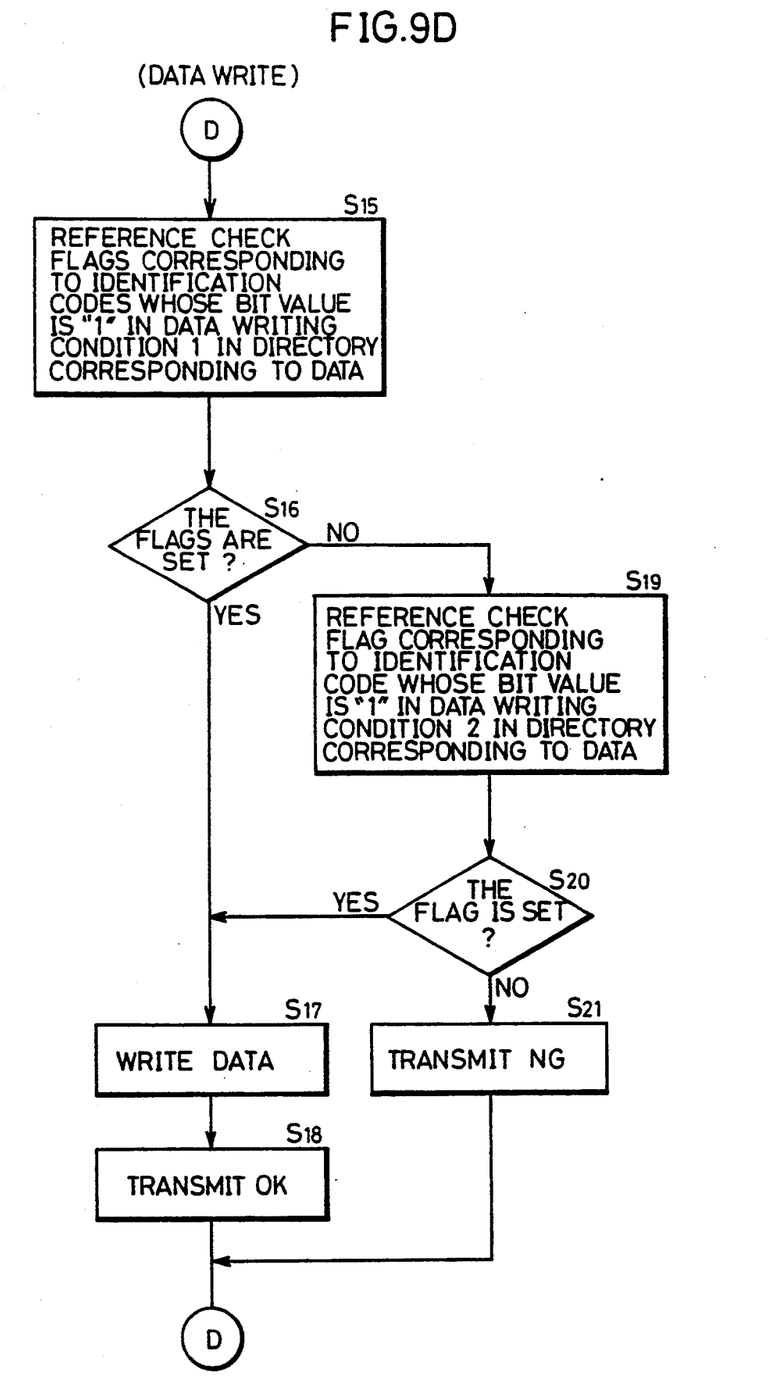

On the other hand, the IC card 1 waits for the reception of a command in the step S43, and checks in response to the reception of a command including the identification code for identifying a terminal from the terminal, coincidence between the identification code for identifying a terminal previously stored and the identification code for identifying a terminal applied from the terminal in the step S44. On this occasion, as described in FIG. 9A, check flags corresponding to the identification codes which coincide with each other are set to "1". Subsequently, in the step S45, O.K. or N.G. signal is transmitted to the terminal. The terminal waits for response in the step S35, and requires, in response to the reception of the response of O.K. signal from the IC card 1, an entry of an identification code of the person himself or herself having a card in the step S36. The terminal transmits the entered identification code to the IC card 1 in the step S37 in response to an entry of the identification code from a keyboard of the terminal by the person having a card. The IC card 1 waits for the reception of a command in the step S46, and checks, in response to the reception of a command including the identification code of the person himself and herself from the terminal, coincidence between an identification code included in the command and the identification code previously stored in the step S47. On this occasion, check flags corresponding to the identification codes which coincide with each other are set to "1". Subsequently, in the step S48, O.K. or N.G. signal is transmitted to the terminal. The terminal waits for response in the step S38, to allow transaction using the terminal by the person having a card in response to the O.K. signal from the IC card 1. When transaction information is entered or reading of the transaction information is designated, the terminal transmits a read/write command of the transaction information to the IC card 1 in the step S39. The IC card 1 waits for the reception of a command in the step S49, and a routine for determining whether or not the reading/writing condition shown in FIG. 9C or 9D is O.K. is implemented in response to the reception of the read/write command from the terminal in the step S50. If the condition is O.K., data is read out or updated in the step S51, and the read-out data or the fact that the data is updated is transmitted to the terminal in the step S52. If the reading/writing condition is not satisfied, access to the data area is not made, so that N.G. signal is transmitted to the terminal. The IC card 1 waits for response in the step S40, to perform processing of the next transaction information in response to the reception of the response from the IC card 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An IC card comprising:
   data storage means for prestoring a plurality of data, said plurality of data being respectively associated with a plurality of data identification codes;
   identification code storage means for prestoring a plurality of second identification codes which permit selective use of at least some of said plurality of data stored in said data storage means;
   reference information storage means for prestoring: (1) said plurality of data identification codes and (2) reference information respectively associated with each data identification code directly indicative of those second identification codes stored in said identification code storage means which are authorized to use the data respectively associated with a data identification code; and
   control means, responsive to the external application to said IC card of a data identification code and at least one second identification code, for selecting one or more second identification codes authorized to use data from said reference information corresponding to the applied data identification code, and determining whether or not a selected second identification code corresponds to the externally applied second identification code, and, if correspondence exists, permitting use of the data associated with the externally applied data identification code.

2. An IC card according to claim 1, wherein:
   said reference information storage means prestores as said reference information for each data identification code, first reference information indicating at least one second identification code and second reference information indicating at least one second identification code; and
   said control means permits the use of the data associated with said applied data identification code when a selected second identification code from the first reference information corresponds to the externally applied second identification code or when a selected second identification code from the second reference information corresponds to the externally applied second identification code.

3. An IC card according to claim 1, wherein said reference information associated with an externally applied data identification code defines at least one second identification code stored in said identification code storage means which must correspond to a second identification code externally applied to said IC card to permit use of the data associated with said externally applied data identification code.

4. An IC card according to claim 3 wherein said reference information defines two or more second identification code stored in said identification code storage means which must respectively correspond to two or more second identification codes externally applied to said IC card to permit use of the associated data stored in the data storage means.

5. An IC card according to claim 1 wherein use of the data stored in the data storage means includes at least one of reading the stored data and writing the stored data.

6. An IC card comprising:

data storage means for prestoring a plurality of data, said plurality of data being respectively associated with a plurality of data identification codes;

identification code storage means for prestoring a plurality of second identification code which permit selective use of at least some of the data stored in said data storage means;

reference information storage means for prestoring: (1) said plurality of data identification codes and (2) reference information respectively associated with each data identification code directly indicative of those second identification codes stored in said identification code storage means which are authorized to use the data respectively associated with a data identification code;

selecting means for selecting, when at least one second identification code is externally applied to said IC card, a corresponding second identification code stored in said identification code storage means;

referencing means for referencing, when a data identification code is externally applied to said IC card, one or more second identification codes indicated in the reference information associated with said externally applied data identification code; and determining means for determining whether or not a second identification code indicated by said reference information associated with said externally applied data identification code is also selected by said selecting means and, if so, permitting use of the data.

7. An IC card according to claim 6, wherein:

said plurality of second identification codes stored in said identification code storage means include at least one terminal identification code for identifying a terminal with which said IC card can be used and at least one person identification code for identifying a person using said IC card; and said selecting means selects, when at least one terminal identification code is externally applied to said IC card, the corresponding terminal identification code stored in said identification code storage means, and selects, when at least one person identification code is externally applied to said IC card, the corresponding person identification code stored in said identification code storage means.

8. An IC card according to claim 6 wherein said reference information associated with an externally applied data identification code defines at least one second identification code stored in said identification code storage means which must correspond to a second identification code externally applied to said IC card to permit use of the data associated with said externally applied data identification code.

9. An IC card according to claim 8 wherein said reference information defines two or more second identification codes stored in said identification code storage means which must respectively correspond to two or more second identification codes externally applied to said IC card to permit use of the associated data stored in the storage means.

10. An IC card according to claim 6 wherein use of the data stored in the data storage means includes at least one of reading the stored data and writing the stored data.

11. A method of operating an IC card comprising the steps of:

receiving at least one externally applied identification code;

comparing said at least one said externally applied identification code with a plurality of internally stored identification codes for correspondence and identifying each of the internally stored identification codes which corresponds to said at least one externally applied identification code;

receiving at least one externally applied data identification code;

selecting data access information corresponding to said at least one externally applied data identification code, said data access information establishing at least one correspondence condition which must exist between one or more externally applied identification codes and one or more internally stored identification codes in order to obtain access to stored data corresponding to said externally applied data identification code; and permitting access to said stored data when the correspondence condition established by said data access information is identified in said comparing step.

12. A method according to claim 11 wherein said access information establishes a plurality of distinct correspondence conditions which must exist between one or more externally applied identification codes and one or more internally stored identification codes, and wherein access to said stored data is permitted when any one of said distinct correspondence conditions is identified in said comparing step.

13. A method according to claim 11 wherein said access includes at least one of the ability to read and write said stored data.

14. A method according to claim 11 wherein said IC card is used with an associated terminal which communicates with said IC card and wherein said terminal supplies said at least one externally applied identification code to said IC card.

15. A method according to claim 14 wherein said at least one externally applied identification code includes a plurality of externally applied identification codes, at least one being a terminal identification code and at least one being a user code.

16. A method according to claim 15 wherein said data identification code is externally applied to said IC card by said terminal in response to a transaction code which is applied to said terminal.

* * * * *